Dec. 9, 1952          J. E. KENNEDY           2,620,987
                 AIR SWEPT PARTITIONED TUBE MILL
Filed April 27, 1949                     2 SHEETS—SHEET 1

INVENTOR.
Joseph E. Kennedy
BY
Pennie, Edmonds, Morton and Barrows
ATTORNEYS

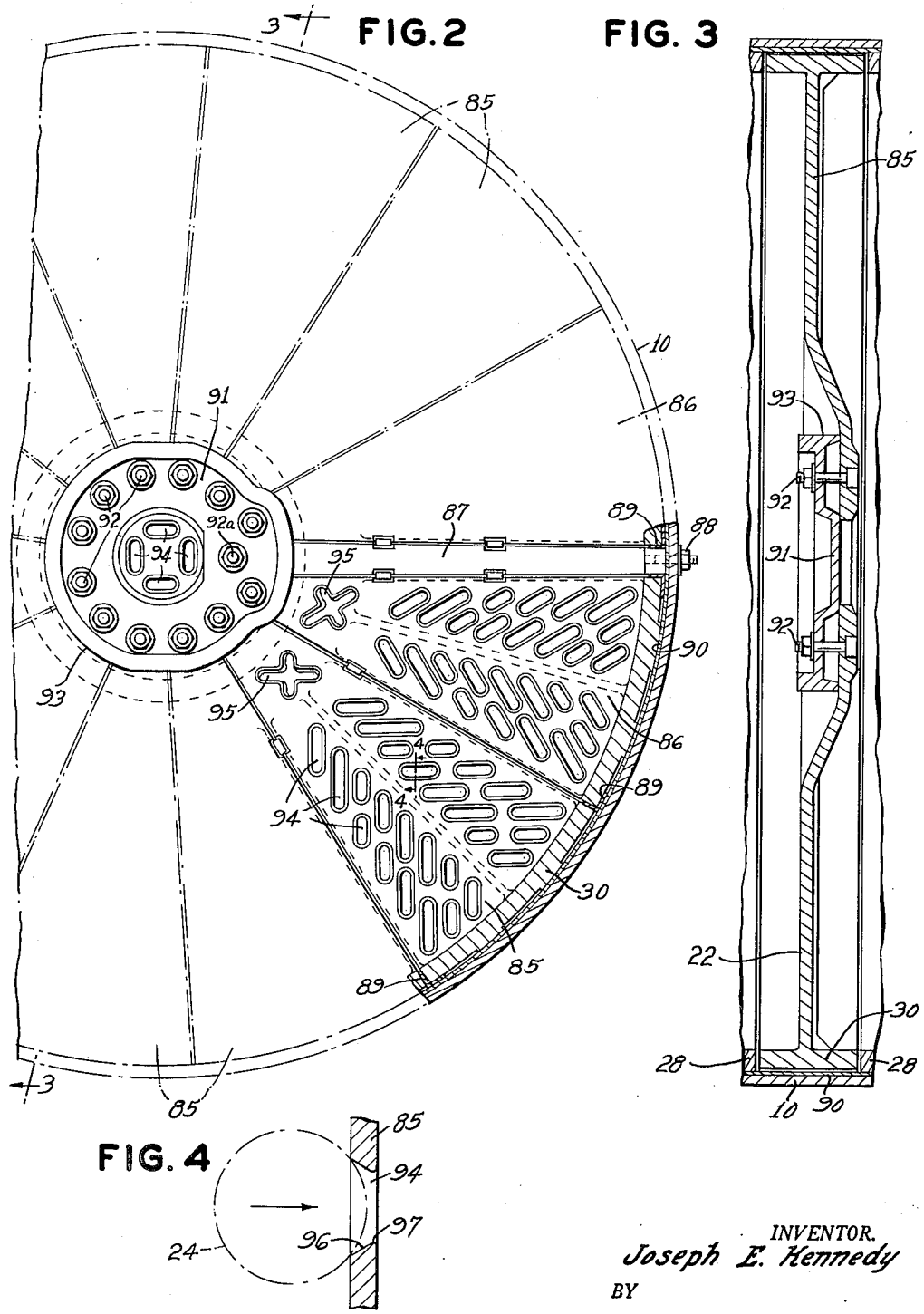

Patented Dec. 9, 1952

2,620,987

UNITED STATES PATENT OFFICE 2,620,987

AIR SWEPT PARTITIONED TUBE MILL

Joseph E. Kennedy, New York, N. Y.

Application April 27, 1949, Serial No. 89,939

6 Claims. (Cl. 241—54)

My invention relates to improvements in the pulverizing or fine grinding of such materials as Portland cement clinker, coal and other materials, and to an improved apparatus including an air-swept partitioned tube mill.

Tube mills or ball mills provided with partitions and balls of different size have been used for grinding materials of the type referred to for many years, but as far as known, it has not been possible heretofore to air-sweep such mills. Air-swept mills without partitions, of course, have been used, but they are in general unsatisfactory for producing the extremely fine grinding required for Portland cement and similar products.

I have invented an apparatus including a novel ball mill which is partitioned, and which may be effectively air-swept, and therefore has definite advantages over previous mills for producing finely pulverized materials. With my new apparatus I can effectively grind cement clinker and like materials to the desired degree of fineness at a rate far in excess of any previously known apparatus. Known partitioned mills were able to produce very fine materials, but of limited throughput. On the other hand, air-swept mills without partitions have not been effective for producing materials of the requisite fineness required for Portland cement and other essentially powdered materials.

I have discovered that if the flow capacities of the inlet and outlet trunnions are greatly enlarged and correlated properly with the internal diameter of a partitioned mill and with the flow area provided in the partition or partitions of the mill, I am able to effectively air-sweep the mill and at the same time secure the fine grinding obtained by the use of masses of grinding balls of progressively smaller diameter.

According to my discovery, I have found that the cross-sectional areas of the inlet and outlet trunnions must be more than 15% of the internal cross-sectional area of the mill and that the combined flow areas through each partition must be as great as that of the inlet or outlet trunnion.

Whereas in the past it has been regarded as desirable to have very narrow openings in mill partitions, I have been able to secure extremely fine grinding of the type required for Portland cement and similar fine materials by providing openings in the partitions greater than three-quarter inch in their smallest dimension. Advantageously, according to my invention, such openings have a minimum dimension of one and one-quarter inches, and in a preferred form of partition, the openings are advantageously oblong in shape with a minimum dimension across the opening of one and three-quarter inches.

By making the inlet and outlet trunnions of the mill exceptionally large so that they have an effective flow area at least of the proportion referred to, and by making the openings in the partition walls so that they have a total opening area equal to the cross-sectional area of each trunnion, I am able to effectively air-sweep the mill and at the same time produce a product of the desired degree of fineness.

Furthermore, I have discovered that with these particular relationships I am able to feed the grinding balls to the mill in the particular sizes desired so that the balls of smaller size will pass through the inlet compartment and through the openings in the partition into the outlet compartment of the mill there to accomplish their purpose of effecting a fine grinding operation. Furthermore, the arrangement is such that as the larger balls in the inlet compartment are worn down to approximately the size of the smaller balls, they will also pass through the openings in the partition wall.

My improved apparatus for effecting the fine grinding of materials of the type referred to advantageously includes an air-swept tube mill having hollow inlet and outlet trunnions of the type described at the respective ends of the mill, passageways therethrough for the flow of air, said passageways having a cross-sectional flow area greater than 15% of the internal cross-sectional area of the mill, at least one partition wall dividing the mill into inlet and outlet grinding compartments, said partition having a combined flow area through the openings or passageways of the partition at least equal to 15% of the cross-sectional area of the inside of the mill.

My apparatus also advantageously includes a fan for drawing air and pulverized material through the mill, a separator for separating relatively coarse particles of material from the air stream, means for conducting the separated coarse particles from the separator to the inlet of the mill, and means for conducting the air stream and the finely ground material from the separator and for recovering the finely ground material from the resulting air stream.

My invention includes other features and advantages as well as other structural details of importance which are described hereinafter in connection with an illustrative embodiment of the invention, described in connection with the accompanying drawings forming a part of this application.

In the drawings:

Fig. 2 is an enlarged sectional view taken on the line 2—2 of Fig. 1, showing the details of construction of my improved partition wall.

Fig. 3 is a broken sectional view taken on the line 3—3 of Fig. 2; and

Fig. 4 is a fragmentary sectional view taken on the line 4—4 of Fig. 2.

Figure 1:
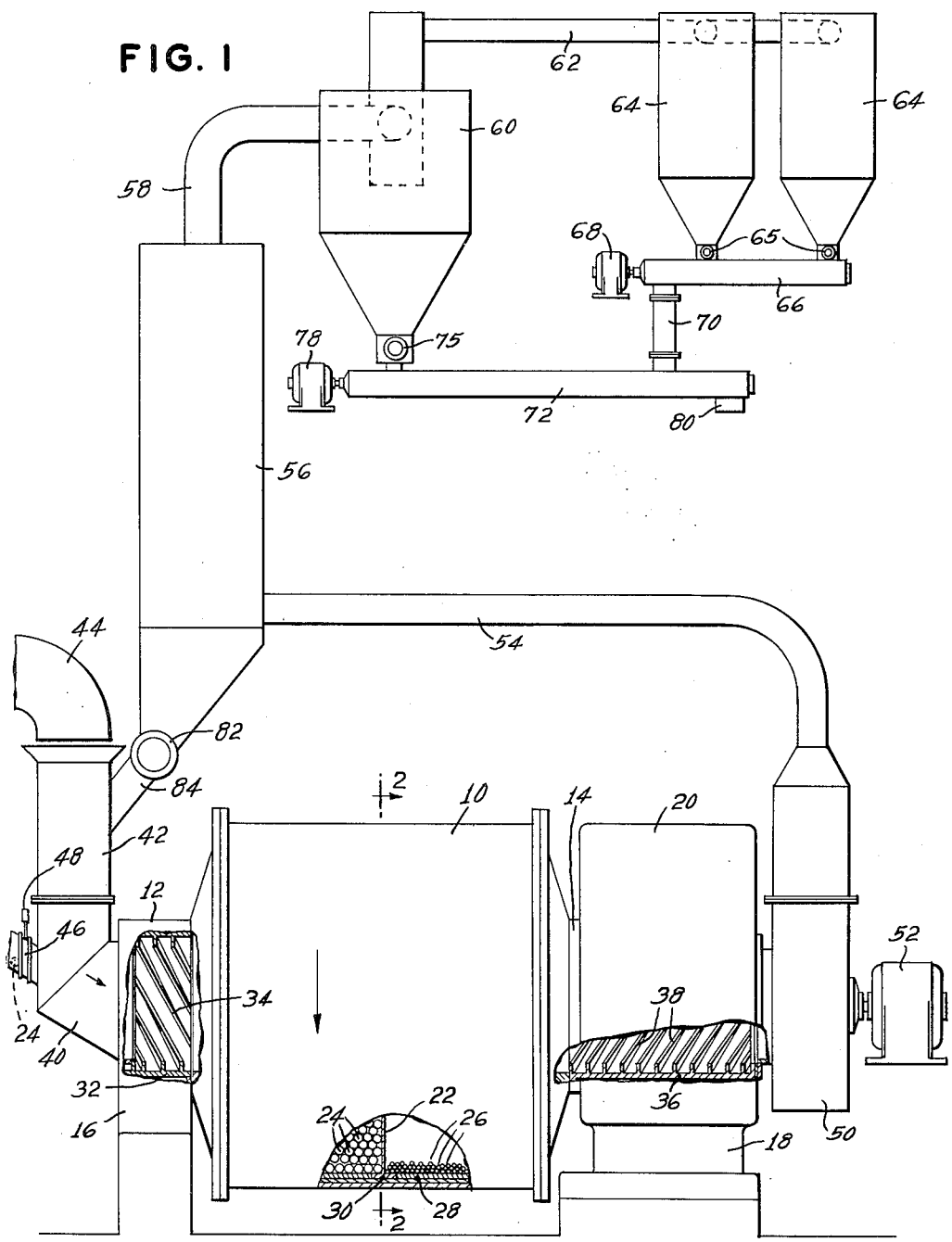
Fig. 1 is an elevational view with parts broken away and shown in section of an apparatus constructed and arranged in accordance with the features of my invention for the fine grinding of materials.

Referring to Fig. 1 of the drawings, the apparatus therein comprises a tube mill or ball mill 10 of suitable diameter supported by its inlet trunnion 12 and its outlet trunnion 14 on bearing supports 16 and 18. The outlet trunnion 14 extends through a gear casing 20 housing a set of driving gears of known type suitable for driving a heavy mill. The cylindrical portion of the mill is divided by one or more partition walls 22, one of which is shown in the particular illustration for dividing the cylindrical portion of the mill lengthwise into inlet and outlet compartments. The partition wall 22 has a multiplicity of openings or passageways referred to later. The inlet end of the mill contains a charge of grinding balls 24 of relatively large diameter while the outlet end of the mill contains a charge of grinding balls 26 of smaller diameter and of a size adapted to pass through the perforations in the partition wall 22.

The cylindrical part of the mill is lined with lining 28 of suitable type and the partition wall advantageously includes a peripheral flange or head 30 fitting between adjacent sections of the lining 28.

The inlet trunnion 12 of the mill includes a sleeve 32 having integral fins 34 for feeding the material to be pulverized into the mill. The outlet trunnion 14 is provided with a similar lining sleeve 36 having fins 38 for feeding coarse material and balls back into the mill as the mill is rotated. The effective internal cross-sectional area of the inlet and outlet trunnion sleeves is more than 15% of the cross-sectional area of the inside of the cylindrical portion of the mill 10, thereby providing a relatively large capacity for the passage of air or gases for sweeping the mill.

My improved tube mill is advantageously included in a unit for pulverizing materials such as cement clinker, this unit, as shown in Fig. 1, comprising an inlet supply chute 40 bearing against the inlet trunnion 12 and having an upwardly extending portion 42 for receiving air and material to be pulverized from a supply duct 44. A chute 46 connects into the lower portion of the chute 40 for supplying grinding balls 24 and 26 to the mill, such supply being controlled by a gate 48.

The outlet trunnion 14 of the mill is connected to a fan 50 for inducing a suitable volume of air at high velocity through the mill for carrying away the pulverized material, the fan 50 may be located at any suitable point in the air sweeping circuit and being driven by an electric motor 52 or by other suitable power means. The stream of air and pulverized material drawn from the mill by the fan 50 is conducted through a duct 54 into a vertical gravity separator 56 in which the coarse particles carried in the air stream are permitted to separate out because of the large diameter of the separator 56 and the relatively low air velocity therein. The pulverized material still carried in the air stream is conducted from the top of the gravity separator 56 through a duct 58 into a cyclone separator 60 in which a large proportion of the pulverized material is separated. The air stream is conducted from the cyclone separator 60 through a duct 62 into one or more filters 64 of known construction and arrangement, in which the air in the current is separated from the dust, the dust being collected in the conical bottoms of the separators 64 and discharged through suitable feeder valves 65 into a conveyor 66. The dust-like product delivered to the conveyor 66, driven by a motor 68, is discharged through a duct 70 into a second conveyor 72 driven by a motor 74 and arranged to receive the pulverized material from the cyclone separator 60 through a feeder valve 75. The combined product in the conveyor 72 is discharged through an outlet 80 to a hopper, storage bin or bagging machine, as desired. The very fine product obtained from the filters 64 may be handled separate from that obtained from cyclone separator 60, if desired, but these two products are advantageously blended in the conveyor 72 in the proportions in which they are obtained from the air stream.

The coarse material separated out in the gravity separator 56 collects in the lower conical portion of the separator above a rotary valve 82, like valves 65 and 75, which is adapted to seal off the separator 56 and at the same time deliver the coarse material into a duct 84 connected into the supply chute 42 so that the coarse material is returned to the mill 10 and subjected to regrinding along with the fresh material introduced thereinto.

The structure of the improved partition wall is shown in detail in Figs. 2, 3 and 4, from which it will be seen that the wall is made up of a plurality of similar radial sections 85, each having the peripheral sectional flange 30 cast integral therewith. In addition to the radial sections 85, the wall includes 2 similar but slightly narrower radial sections 86 on opposite sides of a radially extending partition wedge 87 which is slightly wider at its inner end than at its outer end. When this wedge 87 is inserted and pulled toward the periphery of the shell 10 by screwing up the nut 88, force is applied to the adjacent edges of the radial sections 86 so as to tighten up the entire set of radial sections 85 and 86. The ends of the flanges 30 of the sections 85 and 86 are separated by angle-shaped filler or spacer plates 89 which bear against a liner 90 which lines the inside of the shell 10.

The inner ends of the radial sections 85 and 86 are each bolted to key plate 91 by means of bolts 92, the plate 91 having the structure and reinforcing flanges shown in Fig. 3, so that a rigid wall structure is provided. It will be noted, as shown in Fig. 3, that each of the sections 85 and 86 bear against a flange 93 of the plate 91 and also against the inner base member in the same plane as the face of the flange. The inner end of the wedge 87 is bolted to the plate 91 by a bolt 92a.

An important feature of my invention is the provision of a partition wall having a structure which is correlated with the inlet and outlet trunnion passageways and with the size of the balls used for grinding the material to be pulverized. Accordingly, I advantageously provide radial sections 85 and 86 with relatively large openings for air flow through which balls of relatively large diameter are adapted to pass into the outlet compartment, but which will not pass the large balls 24 until they are worn down to the proper size. The balls 24 are of large diameter. Each radial section 85 or 86 is therefore provided with openings or passageways 94, all having approximately the same width, but which may vary in length in the manner and proportion illustrated. The sections 85 and 86 may also include the cross-shaped openings or passageways 95 which have the same effective width dimension as the passageways 94. The key plate 91, in its central portion also has passageways 94 for the flow of air and pulverized material.

Each of the radial sections 85 and 86 includes as many passageways or as large a flow area as possible consistent with the maintenance of the strength of the wall in order to accomplish proper flow conditions. Fig. 4 illustrates the width dimension of one of the passageways 94 and 95 in relation to the size of one of the large grinding balls 24. Each passageway 94, 95 is arranged so that its up-stream side is provided with a sloping bevel 96 so that the up-stream edges of the passageways will not be burred-in by the pounding of the heavy balls 24. Similarly, the outlet rims of the passages 94 and 95 are rounded slightly as shown at 97 to avoid burring by the pounding of the smaller balls 26. After the larger balls 24 have been worn down to a diameter slightly smaller than the width of the openings 94 and 95, they will pass through the openings from the inlet compartment of the mill 10 into the next or outlet finishing compartment and mingle with the balls 26.

In a particular installation of the apparatus described above unusual efficiencies and grinding results were obtained in the production of Portland cement with a mill having a barrel with an effective internal diameter of nine feet, a nominal length of about seven feet and divided into two compartments by a partition of the construction described. Three-inch balls were used in the inlet compartment and about one-and-three-quarter-inch and smaller balls in the outlet compartment. The openings 94 and 95 in the partition wall had an effective width of one and three-quarter inches, or slightly more, so that the smaller balls could pass therethrough to the outlet compartment. The total flow area of the openings through the partition approximated twenty-two square feet, which is approximately 35% of the cross-sectional area of the inside of the barrel of the mill. The inlet and outlet trunnions each had a diameter such as to give a cross-sectional flow area approximating 12.6 square feet or about 20% of the cross-sectional area of the inside of the mill.

It is important that the flow area through the partition wall be considerably greater than the flow area through the inlet and outlet trunnions, but the difference need not be as great as that represented by the particular figures given directly above.

In starting the operation of the mill such as shown in the drawings, the smaller balls 26 adapted to pass through the openings in the partition are introduced through the chute 46 while the mill is rotating, and thereafter the larger balls 24 are gradually introduced as fast as the smaller balls pass into the outlet compartment. Whenever it is necessary to introduce grinding balls of either size into the mill they are simply poured in through the chute 46. The smaller balls will migrate into the finishing compartment and the larger balls will prevent the return of any great number of small balls to the inlet compartment.

In a grinding operation the fan 50 induces a strong current of air through the mill. A large part of this air and pulverized material will flow through the openings 94 and 95 above the larger balls in the inlet compartment but air also sweeps slowly through the mass of larger balls to pick up the fine dust which it carries through the openings in the partition wall into the finishing compartment. The air also increases the movement of larger particles into the finishing compartment. Furthermore, air from the lower portion of the inlet compartment sweeps slowly through the mass of grinding balls 26 of the outlet compartment to scavenge the dust and finely ground material which is carried through the outlet trunnion 20 and to the separating equipment. It will be apparent that the outlet compartment will contain grinding balls of varying sizes as the one-and-three-quarter inch or smaller balls wear down during the grinding operation.

I claim:

1. An air-swept partitioned rotatable tube mill for pulverizing materials having hollow inlet and outlet trunnion bearings supporting the mill respectively for the passage of the material to be pulverized and air into the mill, and the conducting of air and pulverized material therefrom, said inlet and outlet trunnions having a cross-sectional flow area exceeding 15% of the cross-sectional flow area of the inside of the barrel of the mill, and a partition dividing the barrel of the mill into compartments and having passageways therethrough the total flow area of which substantially exceeds the cross-sectional flow area through the inlet trunnion of the mill.

2. A tube mill as claimed in claim 1, characterized in that the passageways through the partition wall are relatively large and have a minimum dimension exceeding three-quarters of an inch, for the flow of air and pulverized material.

3. A tube mill as claimed in claim 1, in which the passageways through the partition wall each have a minimum dimension of one and one-half inches, whereby smaller grinding balls than said dimension may pass therethrough from the up-stream side of the wall to the compartment on the down-stream side of the wall.

4. A tube mill as claimed in claim 1 in which the passageways in the partition wall each have a minimum dimension of at least one and one-quarter inches, whereby small grinding balls supplied to or contained in the compartment on the up-stream side of the partition wall may pass through the openings into the compartment on the down-stream side of the partition wall.

5. A high capacity air-swept ball mill for grinding materials to produce an extremely fine pulverized product comprising a rotatable barrel member having hollow inlet and outlet trunnions by which the barrel member is supported for rotation, a partition wall in the barrel member dividing it into an up-stream compartment and an outlet finishing compartment, relatively large grinding balls on the up-stream side of said partition wall, and relatively smaller grinding balls on the down-stream side of said partition wall, said partition wall having a multiplicity of passageways therethrough, said passageways having a minimum crosswise dimension of from one and one-quarter inches to one and three-quarter inches, the flow area through each of the trunnions exceeding 15% of the internal cross-sectional area of said barrel member and being at least approximately equal to one-half the total flow area of the passageways through the partition wall, whereby a large capacity is provided for the flow of air through the barrel member.

6. A high capacity air-swept ball mill for grinding materials to produce an extremely fine pulverized product, comprising a rotatable barrel member havng axially aligned hollow inlet and outlet trunnions by which the barrel member is supported for rotation, a partition wall in the barrel member dividing it into an up-stream compartment and an outlet finishing compartment, said partitioning wall having a multiplicity of passageways therethrough, the flow capacities of the inlet and outlet trunnions being correlated with the internal diameter of the barrel member and with the total flow area through the passageways in the partition, said total flow area through the passageways in the partition wall approximating 35% of the cross-sectional area of the inside of the barrel member and the inlet and outlet trunnions having a cross-sectional flow area approximating 20% of the cross-sectional area of the inside of the barrel member, whereby said mill has a large capacity production of pulverized product.

JOSEPH E. KENNEDY.

REFERENCES CITED

The following references are of record in the file of this patent:

UNITED STATES PATENTS

| Number | Name | Date |
|---|---|---|
| 1,589,740 | Bonnot | June 22, 1926 |
| 1,591,941 | Newhouse | July 6, 1926 |
| 1,606,545 | Van Saun | Nov. 9, 1926 |
| 1,609,298 | Kennedy | Dec. 7, 1926 |
| 1,610,345 | William | Dec. 14, 1926 |
| 2,351,870 | Newhouse | June 20, 1944 |

FOREIGN PATENTS

| Number | Country | Date |
|---|---|---|
| 294,677 | Germany | Oct. 20, 1916 |

OTHER REFERENCES

"Denver Equipment Index," Second Edition, Volume I, pages 119–128, 1947.